United States Patent
Shang (10) Patent No.: US 11,498,583 B2
(45) Date of Patent: Nov. 15, 2022

(54) INFORMATION PROCESSING METHOD FOR VEHICLE DRIVING ON CURVE, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventor: Xingqi Shang, Beijing (CN)

(73) Assignee: Apollo Intelligent Connectivity (Beijing) Technology Co., Ltd., Beijing (CN)

(*) Notice: Subject to any disclaimer, the term of this patent is extended or adjusted under 35 U.S.C. 154(b) by 31 days.

(21) Appl. No.: 17/119,999

(22) Filed: Dec. 11, 2020

(65) Prior Publication Data

US 2021/0362738 A1 Nov. 25, 2021

(30) Foreign Application Priority Data

May 19, 2020 (CN) .......................... 202010424055.0

(51) Int. Cl.
*B60Q 1/00* (2006.01)
*B60W 50/16* (2020.01)
(Continued)

(52) U.S. Cl.
CPC .......... *B60W 50/16* (2013.01); *B60W 40/072* (2013.01); *G06V 20/588* (2022.01); *B60W 2554/80* (2020.02); *B60W 2556/10* (2020.02)

(58) Field of Classification Search
CPC .............. B60W 50/16; B60W 40/072; B60W 2554/80; B60W 2556/10; B60W 30/045;
(Continued)

(56) References Cited

U.S. PATENT DOCUMENTS 9,983,013 B1* 5/2018 Krunic ................. G06K 9/6277
2019/0202476 A1* 7/2019 Tao ....................... B60W 30/095
2021/0300370 A1* 9/2021 Tsai ................. B60W 30/18154

FOREIGN PATENT DOCUMENTS

CN 106530827 A 3/2017
CN 107103785 A 8/2017
(Continued)

OTHER PUBLICATIONS

Chinese Patent Application No. 202010424055.0 First Office Action dated Apr. 6, 2021, 9 pages.
(Continued)

*Primary Examiner* — Toan N Pham
(74) *Attorney, Agent, or Firm* — Lathrop GPM LLP (57) ABSTRACT

The disclosure provides an information processing method for a vehicle driving on a curve. The method includes: obtaining a monitored image of a curve; identifying an image position of a first vehicle driving on the curve in the monitored image; determining a target geographic position of the first vehicle according to the image position; and generating prompt information according to the target geographic position of the first vehicle and sending the prompt information, in which, the prompt information is configured to determine vehicle spacing information according to the target geographic position of the first vehicle and a geographic position of a second vehicle receiving the prompt information, and issue a warning based on the vehicle spacing information.

14 Claims, 4 Drawing Sheets

(51) Int. Cl.
*B60W 40/072* (2012.01)
*G06V 20/56* (2022.01)

(58) Field of Classification Search
CPC ...... B60W 30/08; B60W 40/02; B60W 50/14; B60W 2050/146; G06V 20/588; G06V 20/54; G06N 3/08; G08G 1/167
See application file for complete search history.

(56) References Cited

FOREIGN PATENT DOCUMENTS

| | | |
|---|---|---|
| CN | 108777065 A | 11/2018 |
| CN | 108820042 A | 11/2018 |
| CN | 110962844 A | 4/2020 |
| JP | H1153697 | 2/1999 |
| JP | 201877612 A | 5/2018 |
| JP | 2018533107 | 11/2018 |
| JP | 2019125361 | 7/2019 |
| JP | 2019182411 | 10/2019 |
| WO | WO 2015001677 A1 | 1/2015 |

OTHER PUBLICATIONS

Chinese Patent Application No. 202010424055.0 English translation of First Office Action dated Apr. 6, 2021, 10 pages.
European Patent Application No. 20212802.1 extended Search and Opinion dated Jun. 9, 2021, 9 pages.
Japanese Patent Application No. 2021-042115, Office Action dated Sep. 13, 2022; 5 pages.
Japanese Patent Application No. 2021-042115, English translation of Office Action dated Sep. 13, 2022; 5 pages.

\* cited by examiner

INFORMATION PROCESSING METHOD FOR VEHICLE DRIVING ON CURVE, ELECTRONIC DEVICE AND STORAGE MEDIUM

CROSS REFERENCE TO RELATED APPLICATION

This application is based on and claims priority to Chinese Patent Application No. 202010424055.0, filed on May 19, 2020, the entire content of which is hereby incorporated by reference.

TECHNICAL FIELD

The disclosure relates to a traffic safety technical field of image processing, and more particularly, to an information processing method for a vehicle driving on a curve.

BACKGROUND

Currently, with development and popularization of automobiles, traffic safety has become more and more important. Traffic accidents happen too often and casualties and property losses have been too heavy. In fact, losses caused by traffic accidents have far exceeded losses caused by disasters such as earthquakes, floods, and fires. For example, in some sharp curved lanes, such as in continuous and sharp curved sections of mountain roads, in right-angled curved roads in residential areas, or in curved roads at exits of underground garages, it is difficult for drivers to be informed of passing vehicles in advance due to limited vision of the drivers. Therefore, traffic accidents occur very often in these areas because oftentimes drivers can not avoid passing vehicles timely.

SUMMARY

Embodiments of the disclosure provide an information processing method for a vehicle driving on a curve, an electronic device and a storage medium.

In a first aspect, embodiments of the disclosure provide an information processing method for a vehicle driving on a curve. The method includes: obtaining a monitored image of the curve; identifying an image position of a first vehicle driving on the curve in the monitored image; determining a target geographic position of the first vehicle according to the image position; and generating prompt information according to the target geographic position of the first vehicle and sending the prompt information, in which the prompt information is configured to determine vehicle spacing information according to the target geographic position of the first vehicle and a geographic position of a second vehicle receiving the prompt information, and issue a warning based on the vehicle spacing information.

In a second aspect, embodiments of the disclosure provide another information processing method for a vehicle driving on a curve. The method includes: positioning and determining a geographic position of a second vehicle; obtaining prompt information, in which the prompt information is used to indicate a target geographic position of a first vehicle driving on the curve; determining a target vehicle spacing distance according to the target geographic position of the first vehicle and a vehicle geographic position determined by positioning; and issuing a warning based on the target vehicle spacing distance.

In a third aspect, embodiments of the disclosure provide an electronic device. The electronic device includes: at least one processor, and a memory communicatively connected to the at least one processor. The memory stores instructions executable by the at least one processor, and the processor is configured to:
obtain a monitored image of the curve;
identify an image position of a first vehicle driving on the curve in the monitored image;
determine a target geographic position of the first vehicle according to the image position; and
generate prompt information according to the target geographic position of the first vehicle and send the prompt information, wherein the prompt information is configured to determine vehicle spacing information according to the target geographic position of the first vehicle and a geographic position of a second vehicle receiving the prompt information, and issue a warning based on the vehicle spacing information.

In a fourth aspect, embodiments of the disclosure provide a non-transitory computer-readable storage medium storing computer instructions. When the instructions are executed, the computer is caused to implement the method according to the first aspect of the disclosure or the method according to the second aspect of the disclosure.

It should be understood that the content described in this section is not intended to identify the key or important features of the embodiments of the disclosure, nor is it intended to limit the scope of the disclosure. Additional features of the disclosure will be easily understood by the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

An information processing method and an information processing apparatus for a vehicle driving on a curve, an electronic device and a storage medium according to the embodiments of the disclosure are described with reference to the accompany drawings.

Figure 1:
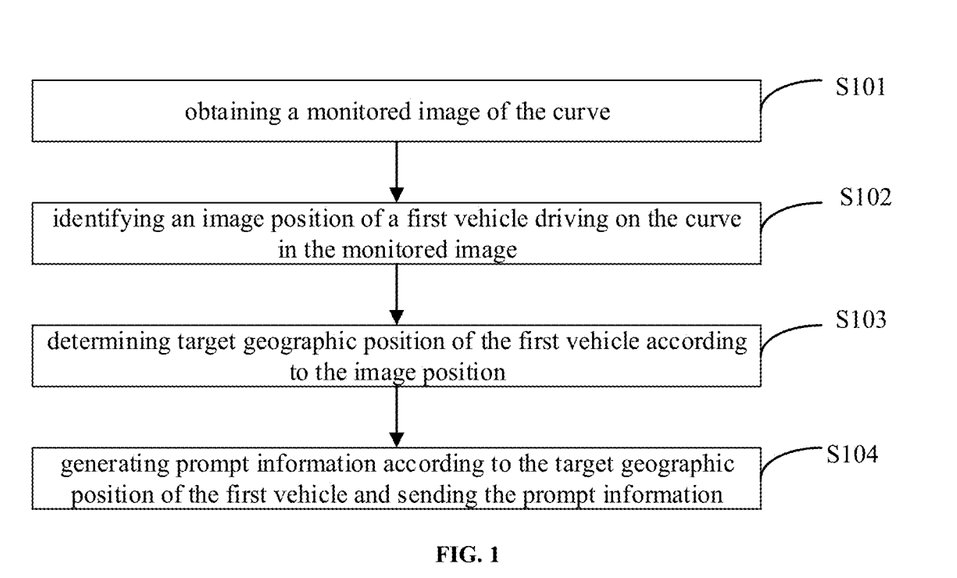
FIG. 1 is a flowchart of an information processing method for a vehicle driving on a curve according to Embodiment 1 of the disclosure.

FIG. 1 is a flowchart of an information processing method for a vehicle driving on a curve according to Embodiment 1 of the disclosure.

For example, in the embodiment of the disclosure, the information processing method is configured in an information processing apparatus. The information processing apparatus is applicable to any electronic device, so that the electronic device is caused to implement an information processing function for the vehicle driving on the curve.

The electronic device for implementing information processing may be an electronic monitoring device fixedly installed at the curve.

As illustrated in FIG. 1, the information processing method for the vehicle driving on the curve may include the following blocks.

At block S101, a monitored image of the curve is obtained.

The curve may be a continuously and sharp curved road in mountainous areas, a right-angle curved road in residential areas, a curved road at an exit of an underground garage, or a curved road in a tunnel and the like.

In the embodiment of the disclosure, the electronic monitoring device fixedly installed at the curve is provided with a wide-angle camera. By collecting an image of the curve through the wide-angle camera, the electronic monitoring device may obtain the monitored image of the curve. The monitored image of the curve may include a first vehicle driving on the curve.

The wide-angle camera is a photographic lens with a focal length shorter than the focal length of a standard camera, a viewing angle larger than the viewing angle of the standard camera, the focal length longer than the focal length of a fish-eye camera, and the viewing angle smaller than that of the fish-eye camera. The wide-angle camera has advantages of long depth of field, large viewing angle and strong sense of perspective. The wide-angle camera shows a considerable range of clarity, and emphasizes perspective effect of pictures, which is conducive to enhancing appeal of the pictures, and obtains a larger viewing range in a limited range. The wide-angle camera emphasizes a contrast of being big at a close distance and being small at a far distance more than other lenses. In images taken by the wide-angle camera, objects closer to the camera are bigger, and objects far from the camera are smaller, so as to produce a strong perspective effect in a depth direction.

Figure 2:
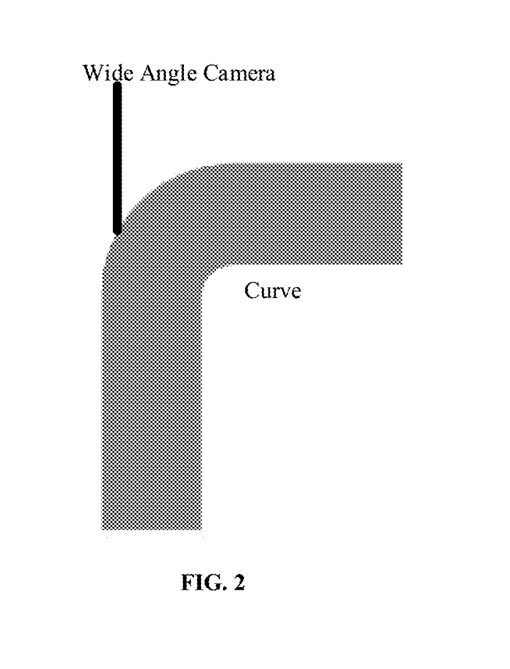
FIG. 2 is a diagram of an example of a curve according to an embodiment of the disclosure.

For example, as illustrated in FIG. 2, after the wide-angle camera installed at the curve collects images on both sides of the curve in real time or at regular intervals, the images are sent to an electronic monitoring device, so that the electronic monitoring device may obtain the monitored image of the curve. The wide-angle camera is configured to collect an image every 200 ms.

At block S102, an image position of a first vehicle driving on the curve in the monitored image is identified.

In the embodiment of the disclosure, after the electronic monitoring device obtains the monitored image of the curve collected by the camera, the image position of the first vehicle in the monitored image is further identified.

As a possible implementation, the monitored image may be input into a trained neural network model, and then a position of the first vehicle in the monitored image is determined according to an output of the model.

The neural network model is obtained by training based on sample images including labeled vehicle positions. Therefore, the monitored image is input into the neural network model, and the image position of the first vehicle in the monitored image is accurately output after the neural network model identifies the first vehicle driving on the curve.

At block S103, a target geographic position of the first vehicle is determined according to the image position.

The target geographic position of the first vehicle driving on the curve refers to the geographic position of the first vehicle in a world coordinate system.

As a possible implementation, a vehicle detection frame indicating the image position may be obtained. Reference coordinates of a marked point in the vehicle detection frame in a reference coordinate system where the monitored image is located are determined. Coordinate transformation is performed on pixel coordinates of the marked point according to a calibration parameter to obtain a geographic position of the marked point in a world coordinate system. Furthermore, the geographic position of the marked point in the world coordinate system is determined as the target geographic position of the first vehicle.

It should be noted that when the number of the first vehicle in the monitored image of the curve is more than one, image positions of a plurality of first vehicles in the monitored image are identified, and the target geographic position of each first vehicle is determined according to the image position of each of the first vehicles respectively.

At block S104, prompt information is generated according to the target geographic position of the first vehicle and the prompt information is sent.

The prompt information is configured to determine vehicle spacing information according to the target geographic position of the first vehicle and the geographic position of a second vehicle receiving the prompt information, and to issue a warning based on the vehicle spacing information.

In the embodiment of the disclosure, Global Positioning System (GPS) or other positioning technologies may be used to obtain the geographic position of the second vehicle receiving the prompt information, which is not limited herein.

In the embodiment of the disclosure, while the vehicle is in motion, after determining the target geographic positions of other first vehicles in the curve, the vehicle spacing information is determined according to the target geographic position of the first vehicle and the geographic position of the second vehicle.

In a possible situation, in response to determine the vehicle spacing information being getting smaller according to the target geographic position of the first vehicle and the geographic position of the second vehicle itself, it may be determined that the first vehicle is driving in the opposite direction to the first vehicle, when the second vehicle is driving to the curve, and a distance between the two vehicles is getting closer. In this case, the electronic monitoring device may send the prompt information to inform the driver of the second vehicle the first vehicle driving in the opposite direction of the curve.

For example, after determining the two vehicles driving towards each other in opposite directions, when the distance between the two vehicles reaches a preset threshold, the prompt information is issued to inform the driver of a vehicle driving in the opposite direction to slow down the vehicle in advance to ensure the safety of the driving vehicle.

It should be noted that when it is determined that the distance between two vehicles is getting smaller, it also may be determined that an in-front vehicle is decelerating, or a rear-front vehicle is accelerating. When the distance between two vehicles is less than a certain distance, the prompt information is required to be sent to inform the vehicle driver to drive safely.

In embodiments of the disclosure, in the case of having a plurality of first vehicles driving on the curve, the target geographic positions of the plurality of first vehicles may be determined. And then the vehicle spacing information is further determined according to the target geographic position of each first vehicle and the geographic position of the second vehicle receiving the prompt information. A first vehicle with the smallest distance to the second vehicle that receives the prompt information is determined based on the vehicle spacing information, and then a warning is issued based on the vehicle spacing information corresponding to the first vehicle with the smallest distance.

With the information processing method for a vehicle driving on a curve according to embodiments of the disclosure, the monitored image of the curve is obtained. The image position of the first vehicle driving on the curve in the monitored image is identified. The target geographic position of the first vehicle is determined according to the image position. The prompt information is generated according to the target geographic position of the first vehicle and the prompt information is sent. The prompt information is configured to determine the vehicle spacing information according to the target geographic position of the first vehicle and the geographic position of the second vehicle receiving the prompt information, and issue the warning based on the vehicle spacing information. Therefore, according to the monitored image of the curve, the vehicle spacing information between the first vehicle and the second vehicle is determined, so as to generate and send the prompt information according to the vehicle spacing information and send the prompt information. Compared with technical problem that is susceptible to weather and other factors, when vehicles driving in an opposite direction on the curve are detected through reflectors in the related art, the disclosure may accurately inform drivers to slow down the vehicles to improve safety of driving the vehicles on the curve.

Figure 3:
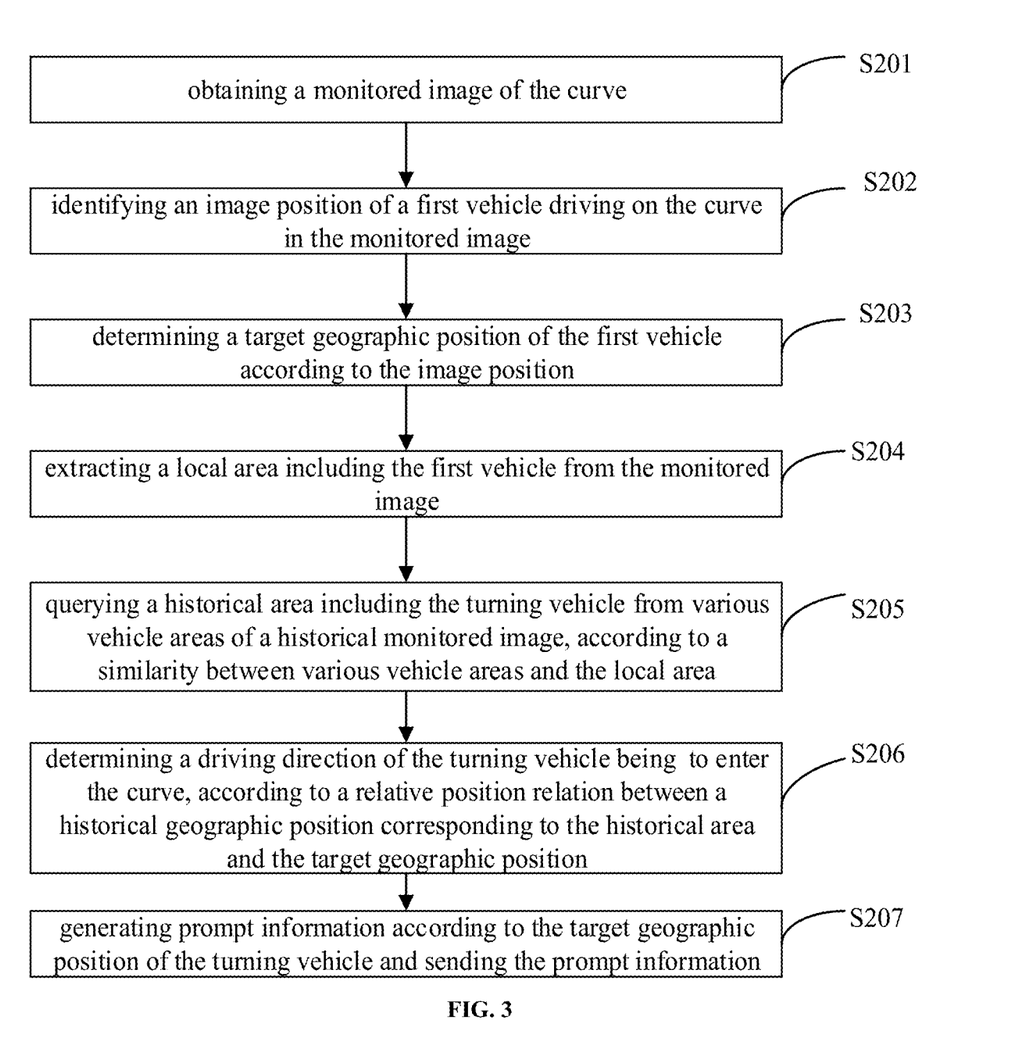
FIG. 3 is a flowchart of an information processing method for a vehicle driving on a curve according to Embodiment 2 of the disclosure.

On the basis of the foregoing embodiments, after determining the target geographic position of the first vehicle according to the image position of the first vehicle in the monitored image, the driving direction of the first vehicle is further determined. The prompt information is generated according to the target geographic position of the first vehicle when the driving direction of the first vehicle is to enter the curve, and the prompt information is sent. The above process is described in detail below with reference to FIG. 3. FIG. 3 is a flowchart of an information processing method for a vehicle driving on a curve according to Embodiment 2 of the disclosure.

As illustrated in FIG. 3, the information processing method includes the following blocks.

At block S201, a monitored image of the curve is obtained.

At block S202, an image position of a first vehicle driving on the curve in the monitored image is identified.

At block S203, a target geographic position of the first vehicle is determined according to the image position.

In the embodiment of the disclosure, the implementation process from block S201 to block S203 refers to the implementation process from block S101 to block S103 in the above-mentioned embodiments, which will not be repeated herein.

At block S204, a local area including the first vehicle is extracted from the monitored image.

In the embodiment of the disclosure, the electronic monitoring device obtains the monitored image of the curve, and identifies the image position of the first vehicle in the monitored image, and further extracts the local area including the first vehicle from the monitored image.

As a possible implementation, after identifying the image position of the first vehicle in the monitored image, segmentation is performed on the monitored image, and the monitored image is segmented into a plurality of areas to extract local areas including the first vehicle from the plurality of the segmented areas.

It should be noted that the method for segmenting the monitored image may be an edge-based image segmentation method, or an area-based image segmentation method, or a pixel clustering-based image segmentation method, which is not limited herein.

At block S205, a historical area including the first vehicle is queried from various vehicle areas of a historical monitored image, according to a similarity between various vehicle areas and the local area.

It is understood that the electronic monitoring device acquires the monitored image in real time or at intervals of a certain period of time. Therefore, the historical monitored image acquired by the electronic monitoring device may also include the first vehicle.

In an embodiment of the disclosure, after the electronic monitoring device obtains the historical monitored image, the image position of the first vehicle in each historical monitored image is identified. The image segmentation is performed on each historical monitored image to extract vehicle local areas from each historical monitored image.

In an embodiment of the disclosure, after obtaining each vehicle local area in the historical monitored image, similarity comparison is performed on each vehicle local area and the local area of the first vehicle extracted at block 205, so that the historical area including the first vehicle is queried from various vehicle areas of the historical monitored image, according to the similarity between various vehicle areas and the local area.

The similarity comparison may be used to score the similarity of contents between two images, and determine the similarity of the image contents according to a level of the score.

In an embodiment of the disclosure, when the similarity comparison is performed on the local area including the first vehicle extracted from the monitored image and each vehicle area in the historical monitored image, a histogram comparison method may be used. In detail, histogram distributions of two areas is obtained. The histogram is segmented into sixty-four sections, and each section has continuous four gray levels. The four gray levels of each section are summed to obtain one data value. In this way, sixty-four data values are obtained to form a vector of the image. Similarly, the two areas input are converted into two vectors, denoted as A and B. Further, the similarity between the two vectors A and B is used to determine the similarity between the local area of the first vehicle and each vehicle area of each historical monitored image.

It should be noted that the above method of determining the similarity between the local area of the first vehicle and each vehicle area of each historical monitored image based on the histogram is only an example. Certainly, other methods for determining the similarity of images may be adopted, which is not repeated herein.

At block S206, it is determined a driving direction of the first vehicle being to enter the curve, according to a relative position relation between a historical geographic position corresponding to the historical area and the target geographic position.

In an embodiment of the disclosure, after determining the historical area of the first vehicle in the historical monitored image, the historical geographic position corresponding to the historical area is determined according to the image position of the historical area in the historical monitored image, and the historical area and the historical geographic position corresponding to the historical area are stored.

Further, after determining the target geographic position of the first vehicle, the driving direction of the first vehicle may be determined according to the relative position relation between the historical geographic position corresponding to the stored historical area and the target geographic position.

In a possible situation, the geographic position of the first vehicle is determined to be more and more closer to the curve according to the relative position relation between the historical geographic position corresponding to the historical area in the historical monitored image of the first vehicle and the target geographic position. And then the driving direction of the first vehicle is to enter the curve.

In another possible situation, the geographic position of the first vehicle is determined to be farther and farther away from the curve according to the relative position relation between the historical geographic position corresponding to the historical area in the historical monitored image of the first vehicle and the target geographic position. And then the driving direction of the first vehicle is determined to leave away from the curve. When the driving direction of the first vehicle is to leave away from the curve, the information of the first vehicle is discarded, and the vehicle information is not processed.

At block S207, prompt information is generated according to the target geographic position of the first vehicle and the prompt information is sent.

In an embodiment of the disclosure, in response to the latest image before the currently monitored image obtained being the historical monitored image, the combination of the historical geographic position and the target geographic position is used as the prompt information, and the prompt information is broadcasted to the second vehicle receiving the prompt information. As a result, the second vehicle that receives the prompt information determines the historical vehicle spacing distance and the target vehicle spacing distance of the first vehicle according to the historical geographic position and the target geographic position of the first vehicle, as well as the vehicle geographic position determined by positioning. And then when the target vehicle spacing distance is less than the historical vehicle spacing distance, the warning is issued in time to improve the safety of vehicle driving.

The electronic monitored device broadcasts the prompt information by means of electromagnetic waves.

With the information processing method for the vehicle driving on the curve according to embodiments of the disclosure, the monitored image of the curve is obtained. The image position of the first vehicle in the monitored image is identified. The target geographic position of the first vehicle is determined according to the image position. The local area including the first vehicle is extracted from the monitored image. The historical area including the first vehicle is queried from various vehicle areas of the historical monitored image, according to the similarity between various vehicle areas and the local area. The driving direction of the first vehicle is determined to enter the curve, according to the relative position relation between the historical geographic position corresponding to the historical area and the target geographic position. The prompt information is generated according to the target geographic position of the first vehicle and is sent. Therefore, the driving direction of the first vehicle is determined according to the relative position relation between the historical geographic position of the first vehicle and the target geographic position. When the first vehicle enters the curve, the prompt information is broadcasted in time to inform the driver to slow down the vehicle.

Figure 4:
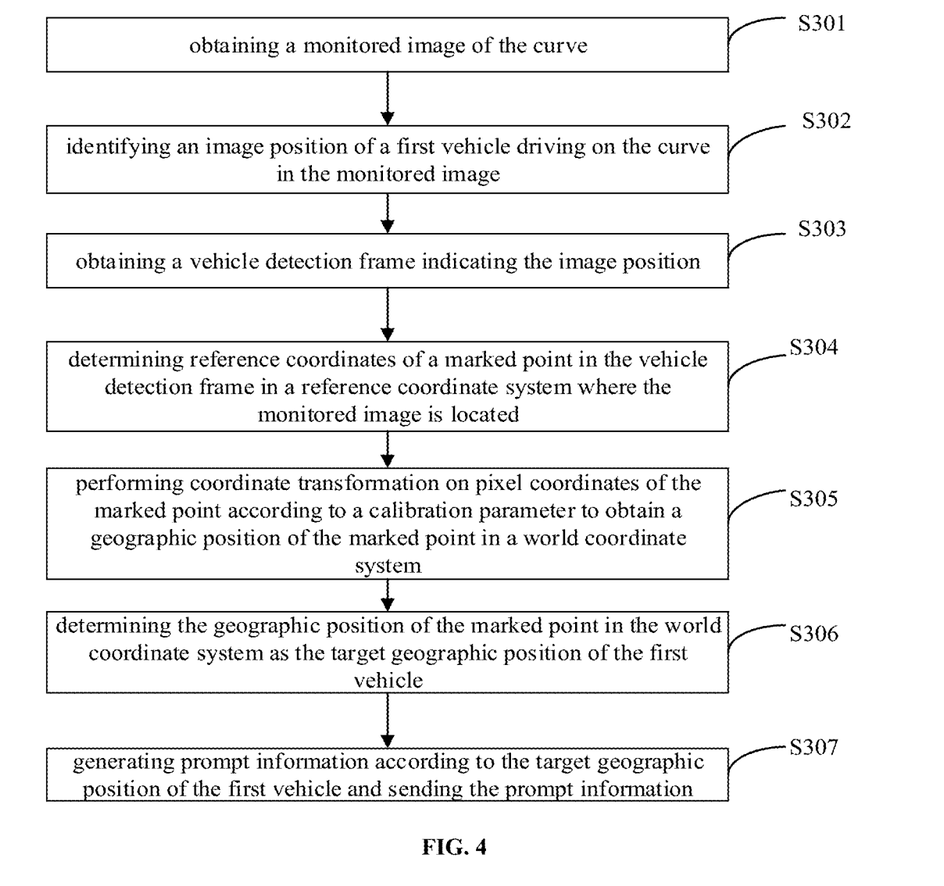
FIG. 4 is a flowchart of an information processing method for a vehicle driving on a curve according to Embodiment 3 of the disclosure.

On the basis of the above-mentioned embodiments, embodiments of the disclosure provide a third information processing method for a vehicle driving on a curve. FIG. 4 is a flowchart of an information processing method for a vehicle driving on a curve according to Embodiment 3 of the position disclosure.

As illustrated in FIG. 4, the information processing method includes the following blocks.

At block S301, a monitored image of the curve is obtained.

At block S302, an image position of a first vehicle driving on the curve in the monitored image is identified.

In an embodiment of the disclosure, the implementation process from block S301 to block S302 refers to the implementation process from block S101 to block S102 in the above-mentioned embodiment, which will not be repeated herein.

At block S303, a vehicle detection frame indicating the image position is obtained.

In an embodiment of the disclosure, after obtaining the monitored image of the curve and identifying the image position of the first vehicle in the monitored image, the vehicle detection frame indicating the image position in the monitored image is identified by a vehicle detection positioning model.

For example, the monitored image with the identified image position may be input to a trained vehicle detection positioning model, so that the model outputs the vehicle detection frame for indicating the image position.

It should be noted that when training the vehicle detection positioning model, model training is carried out by using positive samples including vehicles and negative samples without vehicles to improve the accuracy of extracting vehicle detection frames.

As an example, Yolov3 is used to obtain the vehicle detection frame. The Yolov3 is the third version of target detection algorithms of You Only Look Once (YOLO) series. Compared to previous algorithms, especially for small targets, accuracy has been significantly improved.

At block S304, reference coordinates of a marked point in the vehicle detection frame in a reference coordinate system where the monitored image is located are determined.

For example, a center of the vehicle detection frame is set as the marked point. In an embodiment of the disclosure, after determining the marked point set in the vehicle detection frame, the reference coordinates of the marked points in the reference coordinate system where the monitored image is located are further determined. For example, the acquired coordinates of the vehicle detection frame are assumed as $(x_0, y_0, x_1, y_1)$, and the pixel coordinates of the marked point are assumed as $(x_c, y_c)$. In which $x_c=(x_0+x_1)/2$; $y_c=(y_0+y_1)/2$.

At block S305, coordinate transformation is performed on pixel coordinates of the marked point according to a calibration parameter to obtain a geographic position of the marked point in a world coordinate system.

The calibration parameter includes an angle between a horizontal axis in the reference coordinate system and a latitude direction in the world coordinate system, and a conversion ratio between a unit distance in the reference coordinate system and a unit distance in the world coordinate system.

In an embodiment of the disclosure, after determining the reference coordinates in the reference coordinate system where the monitored image is located, coordinate rotation is performed on the pixel coordinates of the marked point according to the angle between the horizontal axis in the reference coordinate system and the latitude direction in the world coordinate system. Meanwhile, coordinate scaling is performed on the pixel coordinates of the marked point according to the conversion ratio between the unit distance in the reference coordinate system and the unit distance in the world coordinate system, so as to obtain the geographic position in the world coordinate system corresponding to the marker point.

For example, assuming that the acquired coordinates of the vehicle detection frame are $(x_0, y_0, x_1, y_1)$, the local area of the first vehicle and a latitude and a longitude $(e_i, n_i)$ of its geographic position are obtained. The specific calculation process is as follows:

$x_c=(x_0+x_1)/2;$ $y_c=(y_0+y_1)/2;$ the pixel coordinates of the marked point are $(x_c, y_c)$;

$x_d=x_c-w/2;$ $y_d=y_c-h/2;$ $\beta=\arctan(y_d/x_d);$ $d_e=\sqrt{x_d^2+y_d^2}*\cos(\alpha+\beta)*R;$ $d_n=\sqrt{x_d^2+y_d^2}*\sin(\alpha+\beta)*R;$ in which w and h are a width and a height of the monitored image, $\alpha$ is the angle between the horizontal axis in the reference coordinate system and the latitude direction in the world coordinate system, and R is the conversion ratio between the unit distance in the reference coordinate system and the unit distance in the world coordinate system, $d_e$ is the distance between the position of the vehicle and the camera in the longitude direction, and $d_n$ is the distance between the position of the vehicle and the camera in the latitude direction. The latitude and longitude $(e_i, n_i)$ of the geographic position of the first vehicle is obtained, according to the conversion ratio between the unit distance in the reference coordinate system and the unit distance in the world coordinate system.

At block S306, the geographic position of the marked point in the world coordinate system is determined as the target geographic position of the first vehicle.

In an embodiment of the disclosure, after determining the geographic position of the marked point in the world coordinate system, the geographic position of the marked point in the world coordinate system is determined as the target geographic position of the first vehicle.

At block S307, prompt information is generated according to the target geographic position of the first vehicle and the prompt information is sent.

In an embodiment of the disclosure, the implementation process of block S307 is referred to the implementation process of block S104 in the Embodiment 1, which will not be repeated herein.

With the information processing method for a vehicle driving on a curve according to embodiments of the disclosure, the monitored image of the curve is obtained. The image position of the first vehicle in the monitored image is identified. The vehicle detection frame indicating the image position is obtained. The reference coordinates of the marked point in the vehicle detection frame in the reference coordinate system where the monitored image is located are obtained. The coordinate transformation is performed on the pixel coordinates of the marked point according to the calibration parameter to obtain the geographic position of the marked point in the world coordinate system. The geographic position of the marked point in the world coordinate system is determined as the target geographic position of the first vehicle. The prompt information is generated according to the target geographic position of the first vehicle and is sent. Therefore, the target geographic position of the first vehicle is determined according to the geographic position of the marked point in the vehicle detection frame in the world coordinate system, the accuracy of determining the target geographic position of the first vehicle.

Figure 5:
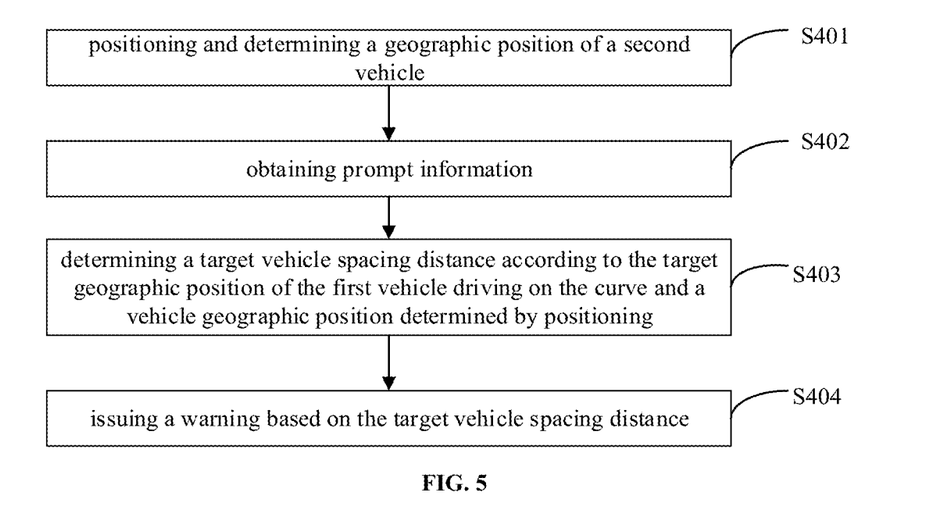
FIG. 5 is a flowchart of an information processing method for a vehicle driving on a curve according to Embodiment 4 of the disclosure.

Based on the foregoing embodiments, the disclosure provides a fourth information processing method for a vehicle driving on a curve. FIG. 5 is a flowchart of an information processing method for a vehicle driving on a curve according to Embodiment 4 of the disclosure.

As illustrated in FIG. 5, the information processing method is executed by an on-board device of the vehicle driving on the curve. The information processing method may include the following blocks.

At block S401, a geographic position of a second vehicle is positioned and determined.

In an embodiment of the disclosure, GPS or other positioning technologies may be used to position and determine the geographic position of the second vehicle, and the specific positioning method is not limited herein.

At block S402, prompt information is obtained.

In a possible situation, the prompt information is used to indicate a target geographic position of a first vehicle driving on the curve.

In another possible situation, the prompt information is also used to indicate a historical geographic position of the first vehicle located prior to the target geographic position.

In an embodiment of the disclosure, a vehicle driving on the curve obtains the prompt information sent by an electronic monitoring device installed at the curve in real time or at intervals.

It is understandable that when the electronic monitoring device set at the curve determines that the first vehicle is entering the curve, the target geographic position of the first vehicle is determined, and the prompt information is sent to the second vehicle driving on the curve, so that the second vehicle driving on the curve may receive the prompt information.

At block S403, a target vehicle spacing distance is determined according to the target geographic position of the first vehicle and a vehicle geographic position determined by positioning.

In an embodiment of the disclosure, after the prompt information sent by the electronic monitoring device is received during the driving of the second vehicle, the target vehicle spacing distance is determined according to the target geographic position of the first vehicle indicated by the prompt information and the geographic position of the second vehicle determined by positioning.

For example, after determining the latitude and the longitude of the first vehicle and the latitude and longitude of the second vehicle, the target vehicle spacing distance is determined according to the latitudes and longitudes of the two vehicles.

At block S404, a warning is issued based on the target vehicle spacing distance.

In an embodiment of the disclosure, a warning module of the second vehicle is controlled to issue the warning in response to detecting that the determined target vehicle spacing distance is getting smaller, according to the target geographic position of the first vehicle and the geographic position of the second vehicle by positioning.

The warning may be given by means of speech prompts, for example, an alarm sound, or a speech prompt, such as "there is a vehicle in the curve ahead, please slow down". The way of issuing the warning is not limited herein.

In a possible situation, when the prompt information received by the driving second vehicle is used to indicate the historical geographic position of the first vehicle located prior to the target geographic position, the historical vehicle spacing distance is determined based on the historical geographic position and the geographic position of the second vehicle determined by positioning. When the target vehicle spacing distance determined based on the target geographic position of the first vehicle and the geographic position of the second vehicle determined by positioning is less than the historical vehicle spacing distance, the first vehicle is a vehicle driving into the curve in the opposite direction. In this case, the warning is issued to inform the driver to slow down.

It should be noted that before issuing the warning based on the target vehicle spacing distance, both the historical vehicle spacing distance and the target vehicle spacing distance are determined to be greater than a positioning error to determine that a signal received by the vehicle is not its own signal, and a situation that the warning module receives the geographic position of its own vehicle is excluded, thereby improving the accuracy of the warning.

With the information processing method for a vehicle driving on a curve according to embodiments of the disclosure, the geographic position of the second vehicle is positioned and determined. The prompt information is obtained, and the prompt information is used to indicate the target geographic position of the first vehicle. The target vehicle spacing distance is determined according to the target geographic position of the first vehicle and the vehicle geographic position determined by positioning. The warning is issued based on the target vehicle spacing distance. Therefore, the target vehicle distance between the first vehicle and the second vehicle determined by positioning is determined according to the obtained prompt information, so as to issue the warning based on the vehicle spacing distance. Technical problem that is susceptible to weather and other factors when vehicles driving in an opposite direction on the curve are detected through reflectors in the related art is solved.

The disclosure may accurately inform drivers to slow down the vehicles to improve safety of driving the vehicles.

In order to implement the above-mentioned embodiments, the disclosure provides an information processing apparatus for a vehicle driving on a curve.

Figure 6:
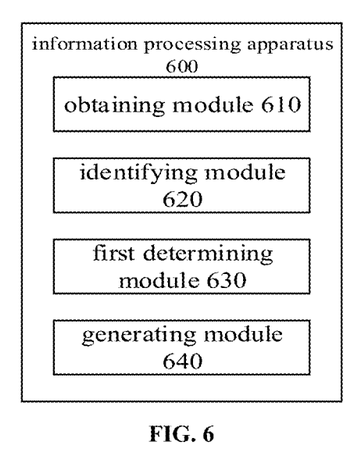
FIG. 6 is a schematic diagram of an information processing apparatus for a vehicle driving on a curve according to Embodiment 5 of the disclosure.

FIG. 6 is a schematic diagram of an information processing apparatus for a vehicle driving on a curve according to Embodiment 5 of the disclosure.

As illustrated in FIG. 6, the information processing apparatus 600 includes: an obtaining module 610, an identifying module 620, a first determining module 630 and a generating module 640. The obtaining module 610 is configured to obtain a monitored image of the curve. The identifying module 620 is configured to identify an image position of a first vehicle driving on the curve in the monitored image. The first determining module 630 is configured to determine a target geographic position of the first vehicle according to the image position. The generating module 640 is configured to generate prompt information according to the target geographic position of the first vehicle and send the prompt information, in which the prompt information is configured to determine vehicle spacing information according to the target geographic position of the first vehicle and a geographic position of a second vehicle receiving the prompt information, and issue a warning based on the vehicle spacing information.

As a possible implementation, the information processing apparatus 600 further includes: an extracting module, a querying module and a second determining module.

The extracting module is configured to extract a local area including the first vehicle from the monitored image.

The querying module is configured to query a historical area including the first vehicle from various vehicle areas of a historical monitored image, according to a similarity between various vehicle areas and the local area; and The second determining module is configured to determine a driving direction of the first vehicle being to enter the curve, according to a relative position relation between a historical geographic position corresponding to the historical area and the target geographic position.

As another possible implementation, the information processing apparatus 600 further includes: a third determining module and a storing module.

The third determining module is configured to determine the historical geographic position corresponding to the historical area according to an image position of the historical area in the historical monitored image.

The storing module is configured to store the historical area and the historical geographic position corresponding to the historical area.

As another possible implementation, the generating module 640 further includes: a generating unit and a broadcasting unit.

The generating unit is configured to determine a combination of the historical geographic position and the target geographic position as the prompt information in response to last acquired image before the monitored image currently acquired being the historical monitored image.

The broadcasting unit is configured to broadcast the prompt information.

As another possible implementation, the first determining module includes: an obtaining unit, a first determining unit, a second determining unit and a third determining unit.

The obtaining unit is configured to obtain a vehicle detection frame indicating the image position.

The first determining unit is configured to determine reference coordinates of a marked point in the vehicle detection frame in a reference coordinate system where the monitored image is located.

The second determining unit is configured to perform coordinate transformation on pixel coordinates of the marked point according to a calibration parameter to obtain a geographic position of the marked point in a world coordinate system.

The third determining unit is configured to determine the geographic position of the marked point in the world coordinate system as the target geographic position of the first vehicle.

As another possible implementation, the calibration parameter includes an angle between a horizontal axis in the reference coordinate system and a latitude direction in the world coordinate system, and a conversion ratio between a unit distance in the reference coordinate system and a unit distance in the world coordinate system.

The second determining unit is configured to: perform coordinate rotation on the pixel coordinates of the marked point according to the angle between the horizontal axis in the reference coordinate system and the latitude direction in the world coordinate system; and perform coordinate scaling on the pixel coordinates of the marked point according to the conversion ratio between the unit distance in the reference coordinate system and the unit distance in the world coordinate system.

With the information processing apparatus for a vehicle driving on a curve according to embodiments of the disclosure, the monitored image of the curve is obtained. The image position of the first vehicle in the monitored image is identified. The target geographic position of the first vehicle is determined according to the image position. The prompt information is generated according to the target geographic position of the first vehicle and the prompt information is sent. The prompt information is configured to determine vehicle spacing information according to the target geographic position of the first vehicle and a geographic position of a second vehicle receiving the prompt information, and issue a warning based on the vehicle spacing information. Therefore, according to the monitored image of the curve, the vehicle spacing information between the first vehicle and the vehicle that receives the prompt information is determined, so as to generate and send the prompt information according to the vehicle spacing information. When a vehicle driving in an opposite direction in the curve is detected through a reflector in the related art, a driver is promptly informed to slow down the vehicle when encountering technical problems that are easily caused by weather and other factors, so that safety of the vehicle when driving in the curve is improved.

In order to implement the above-mentioned embodiment, an embodiment of the disclosure provides another information processing apparatus for a vehicle driving on a curve.

Figure 7:
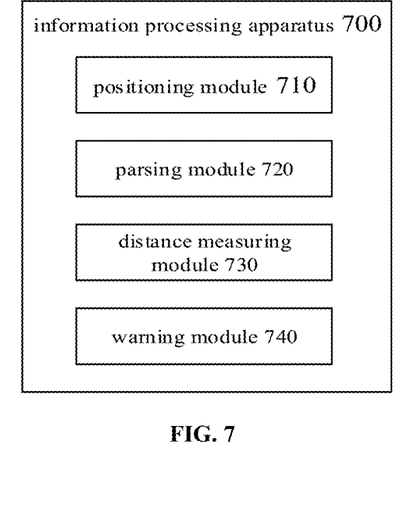
FIG. 7 is a schematic diagram of an information processing apparatus for a vehicle driving on a curve according to Embodiment 6 of the disclosure.

FIG. 7 is a schematic diagram of an information processing apparatus for a vehicle driving on a curve according to Embodiment 6 of the disclosure.

As illustrated in FIG. 7, the information processing apparatus 700 further includes: a positioning module 710, a parsing module 720, a distance measuring module 730 and a warning module 740.

The positioning module 710 is configured to position and determine a geographic position of a second vehicle.

The parsing module 720 is configured to obtain prompt information. The prompt information is used to indicate a target geographic position of a first vehicle driving on the curve.

The distance measuring module 730 is configured to determine a target vehicle spacing distance according to the target geographic position of the first vehicle and a vehicle geographic position determined by positioning.

The warning module 740 is configured to issue a warning based on the target vehicle spacing distance.

In a possible situation, the prompt information is also used to indicate the historical geographic position of the first vehicle prior to the target geographic position. The warning module 740 further includes: a determining unit and a warning unit.

The determining unit is configured to determine a historical vehicle spacing distance according to the historical geographic position and the vehicle geographic position determined by positioning.

The warning unit is configured to issue the warning when the target vehicle spacing distance is less than the historical vehicle spacing distance.

In another possible situation, the information processing apparatus 700 further includes: a determining module, configured to determine the historical vehicle spacing distance and the target vehicle spacing distance being both greater than a positioning error before issuing the warning.

With the information processing apparatus for a vehicle driving on a curve according to embodiments of the disclosure, the geographic position of the second vehicle is determined by positioning, the prompt information is obtained, the prompt information is configured to indicate the target geographic position of the first vehicle, determine vehicle spacing information according to the target geographic position of the first vehicle and a geographic position of a vehicle determined by positioning, and issue a warning based on the vehicle spacing information. Therefore, the target vehicle spacing distance between the first vehicle and the second vehicle determined by positioning is determined according to the obtained prompt information, so as to issue a warning according to the vehicle spacing distance, which solves the problem of determining the vehicle in the opposite direction in the curve through the reflector in the related art, a driver is promptly informed to slow down the vehicle when encountering technical problems that are easily caused by weather and other factors, so that safety of the vehicle when driving in the curve is improved.

According to the embodiments of the disclosure, the disclosure also provides an electronic device and a readable storage medium.

Figure 8:
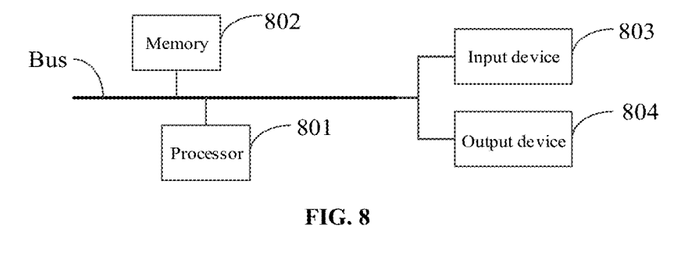
FIG. 8 is a block diagram of an electronic device used to implement the information processing method according to embodiments of the disclosure.

FIG. 8 is a block diagram of an electronic device used to implement the information processing method according to an embodiment of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 8, the electronic device includes: one or more processors 801, a memory 802, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 801 is taken as an example in FIG. 8.

The memory 802 is a non-transitory computer-readable storage medium according to the disclosure. The memory stores instructions executable by at least one processor, so that the at least one processor executes the information processing method according to the disclosure. The non-transitory computer-readable storage medium of the disclosure stores computer instructions, which are used to cause a computer to execute the information processing method according to the disclosure.

As a non-transitory computer-readable storage medium, the memory 802 is configured to store non-transitory software programs, non-transitory computer executable programs and modules, such as program instructions/modules corresponding to the information processing method in the embodiment of the present disclosure. The processor 801 executes various functional applications and data processing of the server by running non-transitory software programs, instructions, and modules stored in the memory 802, that is, implementing the information processing method in the foregoing method embodiments.

The memory 802 may include a storage program area and a storage data area, where the storage program area may store an operating system and application programs required for at least one function. The storage data area may store data created according to the use of the electronic device for implementing the information processing method. In addition, the memory 802 may include a high-speed random access memory, and a non-transitory memory, such as at least one magnetic disk storage device, a flash memory device, or other non-transitory solid-state storage device. In some embodiments, the memory 802 may optionally include a memory remotely disposed with respect to the processor 801, and these remote memories may be connected to the electronic device for implementing the information processing method through a network. Examples of the above network include, but are not limited to, the Internet, an intranet, a local area network, a mobile communication network, and combinations thereof.

The electronic device for implementing the information processing method may further include: an input device 803 and an output device 804. The processor 801, the memory 802, the input device 803, and the output device 804 may be connected through a bus or in other manners. In FIG. 8, the connection through the bus is taken as an example.

The input device 803 may receive inputted numeric or character information, and generate key signal inputs related to user settings and function control of an electronic device for implementing the information processing method, such as a touch screen, a keypad, a mouse, a trackpad, a touchpad, an indication rod, one or more mouse buttons, trackballs, joysticks and other input devices. The output device 804 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

With the technical solution according to embodiments of the disclosure, the monitored image of the curve is obtained. The image position of the first vehicle in the monitored image is identified. The target geographic position of the first vehicle is determined according to the image position. The prompt information is generated according to the target geographic position of the first vehicle and sent. The prompt information is configured to determine vehicle spacing information according to the target geographic position of the first vehicle and a geographic position of a vehicle receiving the prompt information, and issue a warning based on the vehicle spacing information. Therefore, according to the monitored image of the curve, the vehicle spacing distance between the first vehicle and the vehicle that receives the prompt information is determined, to generate and send the prompt information according to the vehicle spacing distance, so that when a vehicle driving in an opposite direction in the curve is detected through a reflector in the related art, a driver is promptly informed to slow down the vehicle when encountering technical problems that are easily caused by weather and other factors, so that safety of the vehicle when driving in the curve is improved.

It should be understood that various forms of processes shown above may be used to reorder, add, or delete steps. For example, the steps described in the disclosure may be performed in parallel, sequentially, or in different orders. As long as the desired results of the technical solutions disclosed in the disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. An information processing method for a vehicle driving on a curve, comprising:
    obtaining a monitored image of the curve;
    identifying an image position of a first vehicle driving on the curve in the monitored image;
    determining a target geographic position of the first vehicle according to the image position; and
    generating prompt information according to the target geographic position of the first vehicle and sending the prompt information, wherein the prompt information is configured to determine a target vehicle spacing distance according to the target geographic position of the first vehicle and a geographic position of a second vehicle receiving the prompt information, and issue a warning based on the target vehicle spacing distance;
    wherein the warning is issued after determining that a historical vehicle spacing distance and the target vehicle spacing distance are both greater than a positioning error.

2. The method according to claim 1, before generating the prompt information according to the target geographic position of the first vehicle and sending the prompt information, further comprising:
    extracting a local area including the first vehicle from the monitored image;
    querying a historical area including the first vehicle from various vehicle areas of a historical monitored image, according to a similarity between various vehicle areas and the local area; and
    determining a driving direction of the first vehicle being to enter the curve, according to a relative position relation between a historical geographic position corresponding to the historical area and the target geographic position.

3. The method according to claim 2, before determining the relative position relation between the historical geographic position corresponding to the historical area and the target geographic position, further comprising:
    determining the historical geographic position corresponding to the historical area according to an image position of the historical area in the historical monitored image; and
    storing the historical area and the historical geographic position corresponding to the historical area.

4. The method according to claim 2, wherein the generating the prompt information according to the target geographic position of the first vehicle and sending the prompt information comprises:
    determining a combination of the historical geographic position and the target geographic position as the prompt information in response to last acquired image before the monitored image currently acquired being the historical monitored image; and
    broadcasting the prompt information.

5. The method according to claim 1, wherein the determining the target geographic position of the first vehicle according to the image position comprises:
    obtaining a vehicle detection frame indicating the image position;
    determining reference coordinates of a marked point in the vehicle detection frame in a reference coordinate system where the monitored image is located;
    performing coordinate transformation on pixel coordinates of the marked point according to a calibration parameter to obtain a geographic position of the marked point in a world coordinate system; and
    determining the geographic position of the marked point in the world coordinate system as the target geographic position of the first vehicle.

6. The method according to claim 5, wherein the calibration parameter comprises an angle between a horizontal axis in the reference coordinate system and a latitude direction in the world coordinate system, and a conversion ratio between a unit distance in the reference coordinate system and a unit distance in the world coordinate system; and
    the performing the coordinate transformation on the pixel coordinates of the marked point according to the calibration parameter to obtain the geographic position of the marked point in the world coordinate system comprises:
    performing coordinate rotation on the pixel coordinates of the marked point according to the angle between the horizontal axis in the reference coordinate system and the latitude direction in the world coordinate system; and
    performing coordinate scaling on the pixel coordinates of the marked point according to the conversion ratio between the unit distance in the reference coordinate system and the unit distance in the world coordinate system.

7. An information processing method for a vehicle driving on a curve, comprising:

positioning and determining a geographic position of a second vehicle;

obtaining prompt information, wherein the prompt information is used to indicate a target geographic position of a first vehicle driving on the curve;

determining a target vehicle spacing distance according to the target geographic position of the first vehicle and a vehicle geographic position determined by positioning; and issuing a warning based on the target vehicle spacing distance;

the method further comprising:

determining a historical vehicle spacing distance and the target vehicle spacing distance being both greater than a positioning error before issuing the warning.

8. The method according to claim 7, wherein the prompt information is further used to indicate a historical geographic position of the first vehicle located prior to the target geographic position, and issuing the warning based on the target vehicle spacing distance comprises:

determining the historical vehicle spacing distance according to the historical geographic position and the vehicle geographic position determined by positioning; and issuing the warning when the target vehicle spacing distance is less than the historical vehicle spacing distance.

9. An electronic device, comprising:

at least one processor; and a memory connected in communication with the at least one processor; wherein, the memory stores instructions executable by the at least one processor, and the processor is configured to:

obtain a monitored image of the curve;

identify an image position of a first vehicle driving on the curve in the monitored image;

determine a target geographic position of the first vehicle according to the image position; and generate prompt information according to the target geographic position of the first vehicle and send the prompt information, wherein the prompt information is configured to determine a target vehicle spacing distance according to the target geographic position of the first vehicle and a geographic position of a second vehicle receiving the prompt information, and issue a warning based on the target vehicle spacing distance;

wherein the warning is issued after determining that a historical vehicle spacing distance and the target vehicle spacing distance are both greater than a positioning error.

10. The electronic device according to claim 9, wherein the processor is configured to:

extract a local area including the first vehicle from the monitored image;

query a historical area including the first vehicle from various vehicle areas of a historical monitored image, according to a similarity between various vehicle areas and the local area; and determine a driving direction of the first vehicle being to enter the curve, according to a relative position relation between a historical geographic position corresponding to the historical area and the target geographic position.

11. The electronic device according to claim 10, wherein the processor is configured to:

determine the historical geographic position corresponding to the historical area according to an image position of the historical area in the historical monitored image; and store the historical area and the historical geographic position corresponding to the historical area.

12. The electronic device according to claim 10, wherein the processor is configured to:

determine a combination of the historical geographic position and the target geographic position as the prompt information in response to last acquired image before the monitored image currently acquired being the historical monitored image; and broadcast the prompt information.

13. The electronic device according to claim 9, wherein the processor is configured to:

obtain a vehicle detection frame indicating the image position;

determine reference coordinates of a marked point in the vehicle detection frame in a reference coordinate system where the monitored image is located;

perform coordinate transformation on pixel coordinates of the marked point according to a calibration parameter to obtain a geographic position of the marked point in a world coordinate system; and determine the geographic position of the marked point in the world coordinate system as the target geographic position of the first vehicle.

14. The electronic device according to claim 13, wherein the calibration parameter comprises an angle between a horizontal axis in the reference coordinate system and a latitude direction in the world coordinate system, and a conversion ratio between a unit distance in the reference coordinate system and a unit distance in the world coordinate system; and the processor is configured to:

perform coordinate rotation on the pixel coordinates of the marked point according to the angle between the horizontal axis in the reference coordinate system and the latitude direction in the world coordinate system; and perform coordinate scaling on the pixel coordinates of the marked point according to the conversion ratio between the unit distance in the reference coordinate system and the unit distance in the world coordinate system.

\* \* \* \* \*